United States Patent [19]

Wimpee et al.

[11] Patent Number: 5,015,434
[45] Date of Patent: May 14, 1991

[54] FIXED IN-CORE CALIBRATION DEVICES FOR BWR FLUX MONITORS

[75] Inventors: Lealon C. Wimpee; Monty A. Ross; Timothy J. O'Neil, all of San Jose; Edward M. Dean Chu, Los Altos, all of Calif.

[73] Assignee: General Electric Company, San Jose, Calif.

[21] Appl. No.: 366,001

[22] Filed: Jun. 13, 1989

[51] Int. Cl.$^5$ .............................................. G21C 17/00
[52] U.S. Cl. .................... 376/254; 376/255; 376/247
[58] Field of Search ................... 376/254, 255, 247

[56] References Cited

U.S. PATENT DOCUMENTS

| | | | |
|---|---|---|---|
| 3,760,183 | 9/1973 | Neissel | 376/254 |
| 4,440,716 | 4/1984 | Smith | 376/247 |
| 4,774,050 | 9/1988 | Impink, Jr. | 376/245 |
| 4,818,471 | 4/1989 | Thomson | 376/254 |

Primary Examiner—Brooks H. Hunt
Assistant Examiner—Meena Chelliah
Attorney, Agent, or Firm—Robert R. Schroeder

[57] ABSTRACT

In the core of a boiling water nuclear reactor, local power range monitor strings typically including four vertically spaced monitoring sites are modified. Each monitoring site includes a conventional local power range detector in which fissionable material exposed to thermal neutron radiation produces fission fragments, ionizes a gas and produces a current between the anode and cathode. In the improvement herein, each conventional local power range detector is provided with one or two adjacent gamma thermometers; each gamma thermometer including an interior mass to be heated by gamma radiation, a thermocouple for measuring the heated mass and a reference thermocouple connected in series. Both the conventional local power range detector and the gamma thermometer(s) are all geometrically arranged in a string with individual connecting cables leading to external connectors, one for each detector and gamma thermometer. When the sring is inserted into the core and the reactor operated at a steady state, the gamma thermometers can be utilized to calibrate the local power range detectors in conjunction with a convetional reactor heat balance. By the expedient of referencing the gamma flux to the output of the heat balance, calibration of the local power range monitors occurs over their useful in-service life.

3 Claims, 3 Drawing Sheets

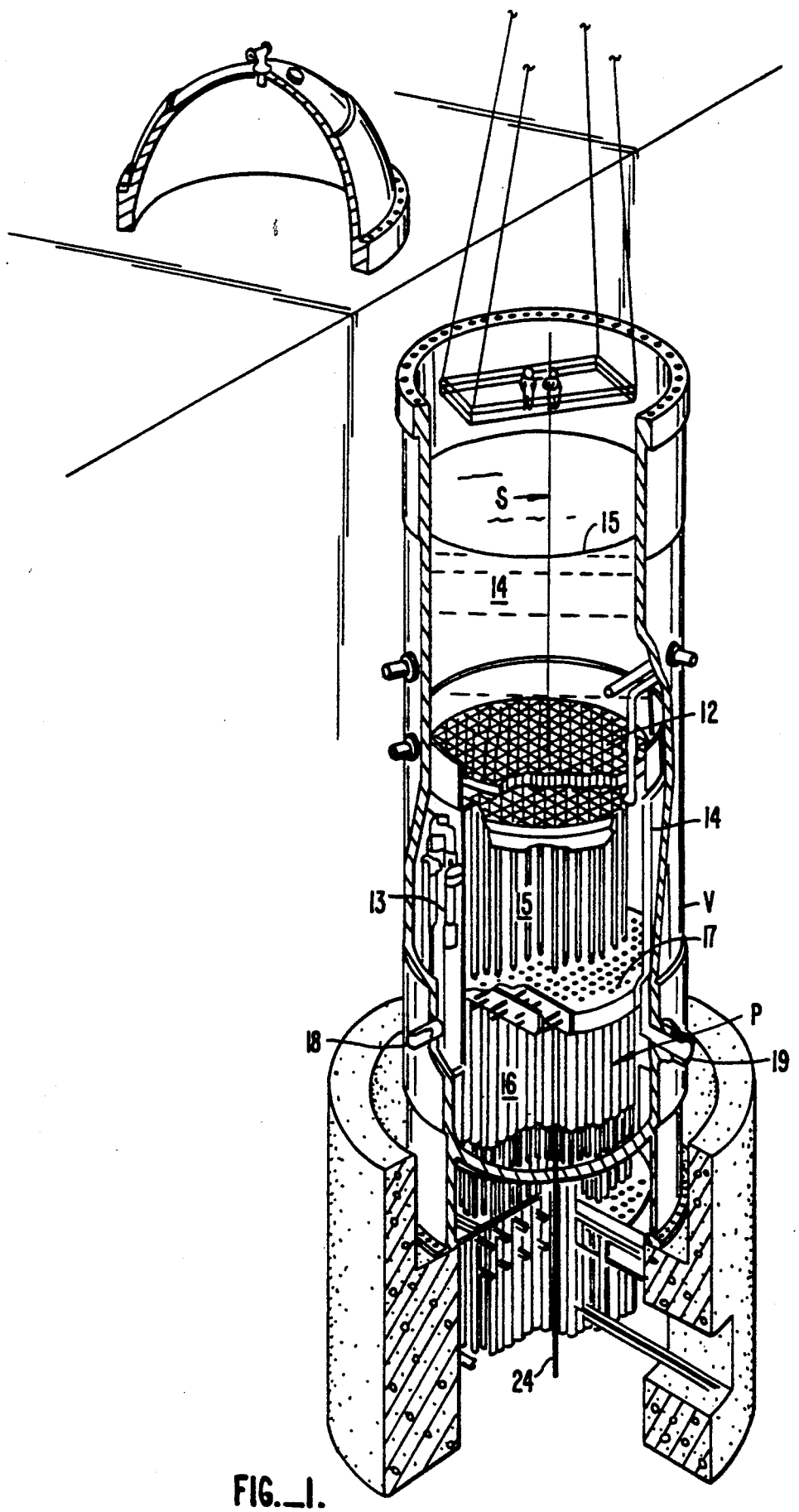
FIG._1.

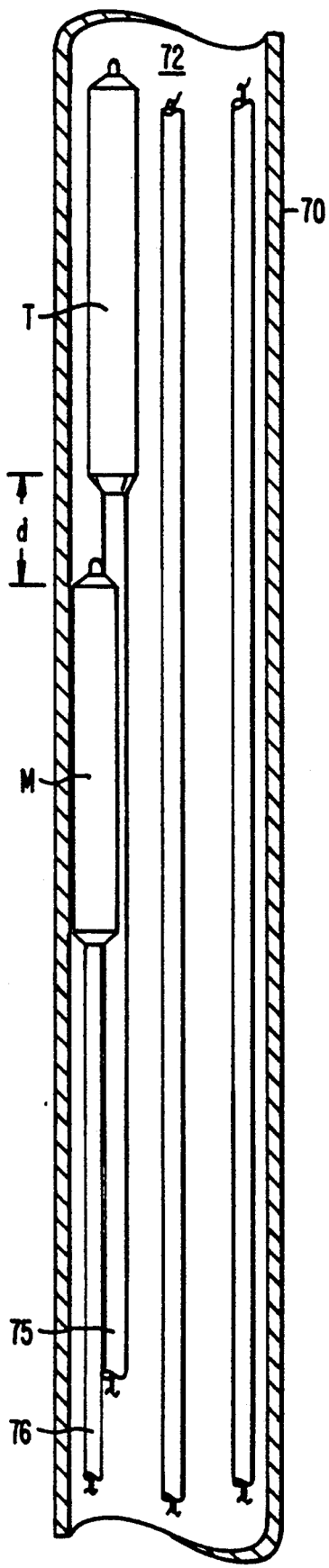
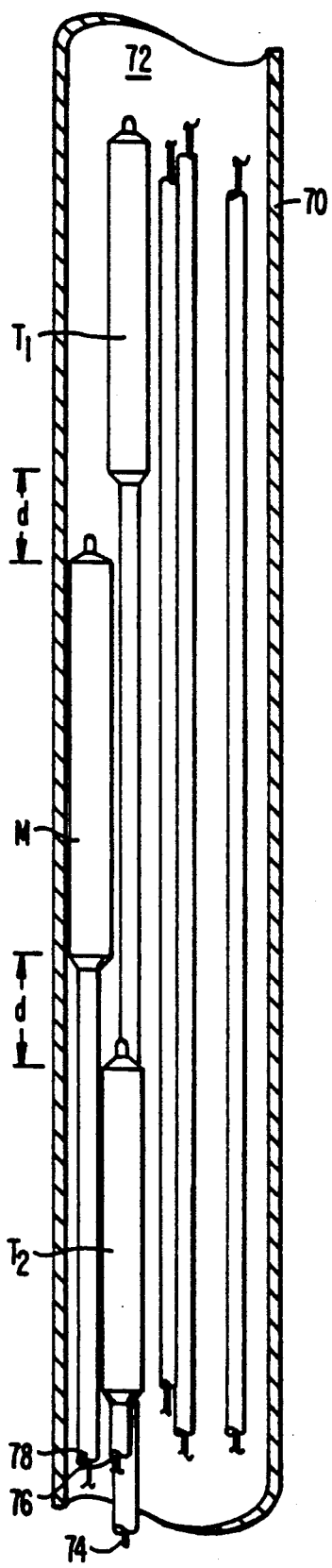
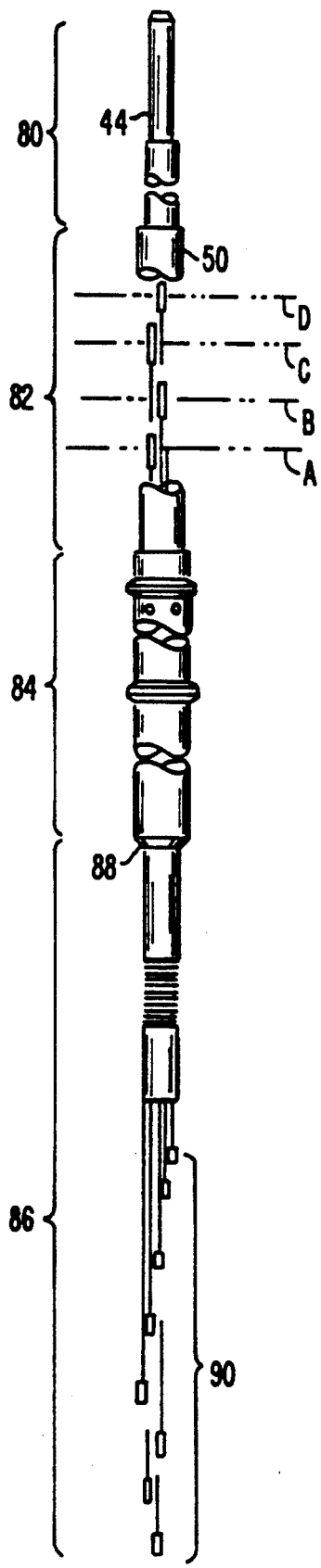
FIG._2C.   FIG._2B.   FIG._2A.

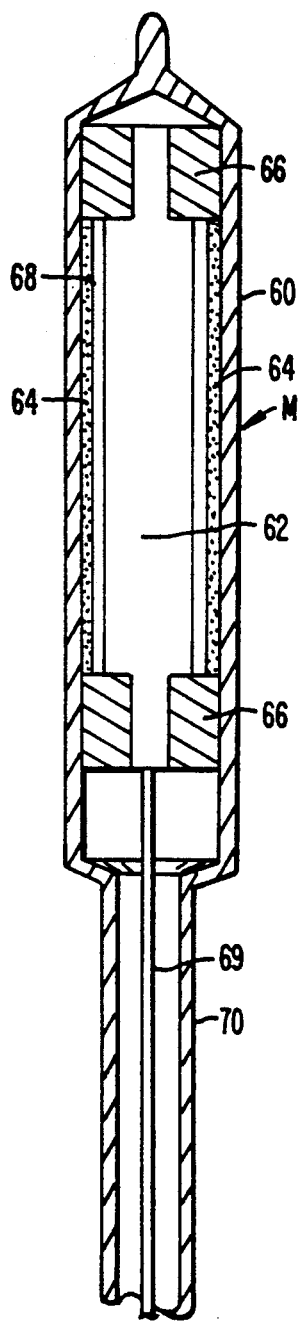
FIG._3.
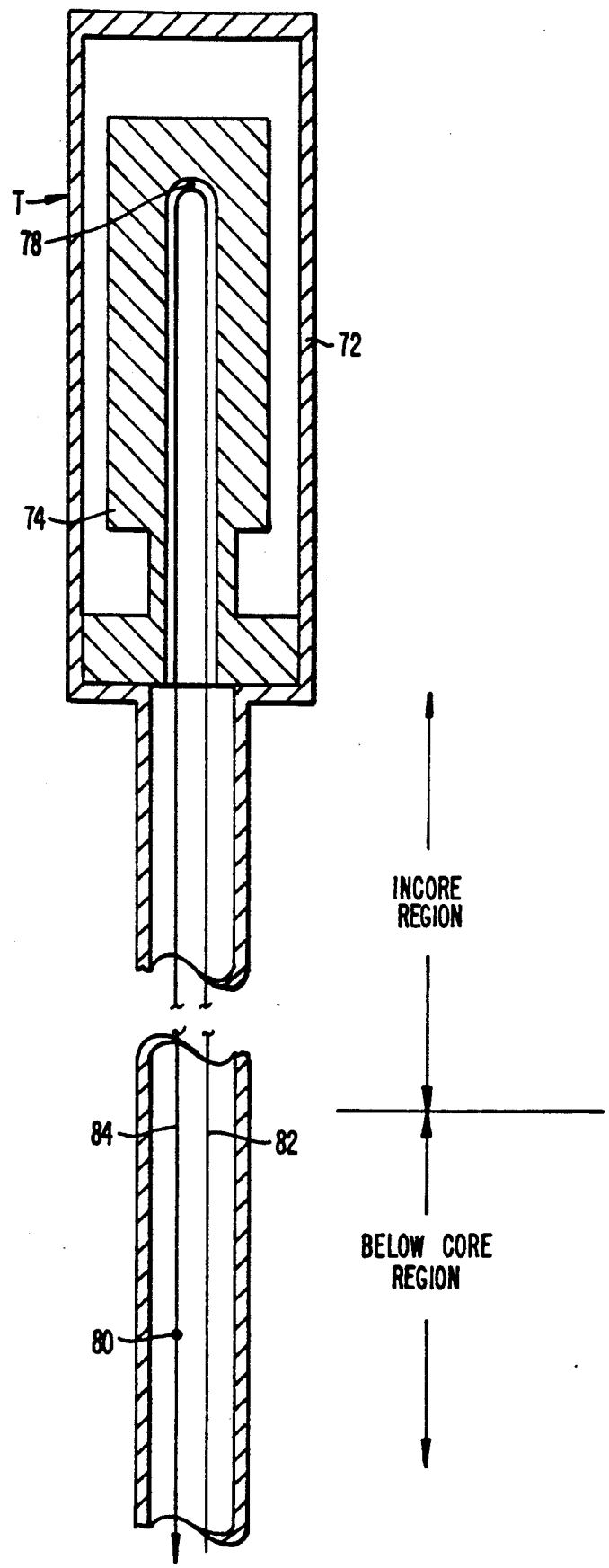
FIG._4.

FIXED IN-CORE CALIBRATION DEVICES FOR BWR FLUX MONITORS

BACKGROUND OF THE INVENTION

This invention relates to the monitoring of thermal neutron flux within a nuclear reactor. More particularly, a new monitoring string having paired or grouped conventional local power range detectors and gamma thermometers is utilized, the disclosed utility including relating gamma thermometer output to a heat balance used for in-service life local power range detector calibration.

In the nuclear reaction interior of conventional boiling water reactors (BWR), it is possible to monitor the state of the reaction by either the measurement of thermal neutron flux or alternatively gamma ray flux.

Thermal neutron flux is the preferred measurement. As it is directly proportional to power and provides for a prompt (instantaneous) signal from a fission chamber. The alternative measurement of gamma radiation does not have the required prompt response necessary for reactor safety requirements. Consequently, gamma radiation as measured by gamma thermometers is not used to measure and immediately control the state of a reaction in boiling water nuclear reactors.

Boiling water reactors have their thermal neutron flux monitored by local power range detectors. These local power range detectors include a cathode having fissionable material coated thereon. The fissionable material is usually a mixture of U235 and U234. The U235 is to provide a signal proportional to neutron flux and the U234 to lengthen the life of the detector. The thermal neutrons interact with the U235 and cause fission fragments to ionize an inert gas environment, typically argon, interior of the conventional local power range detector. There results an electric charge flow between the anode and cathode with the resultant DC current. The amperage of the DC current indicates on a substantial real time basis the thermal neutron flux within the reactor core.

The boiling water reactor local power range detectors are inserted to the core of the reactor in strings. Each string extends vertically and typically has four spaced apart local power range detectors. Each detector is electrically connected for reading the thermal neutron flux in real time and for outputting the state of the reaction within the reactor. It is to be understood that a large reactor can have on the order of 30 to 50 such vertical strings with a total of about 120 to 200 local power range detectors. Such local power range detectors use finite amounts of U235 during their in-service life. Consequently the sensitivity changes with exposure. They must be periodically calibrated.

Calibration is presently accomplished by using traversing in-core probes or (TIPs). These traversing in-core probes are typically withdrawn from the reactor, as the traversing in-core probes are of the same basic construction as the local power range detectors and thus change their sensitivity with in-service life due to uranium 235 burnup.

In operation, the traversing in-core probes are typically calibrated. Such calibration includes inserting about five such probes separately to a common portion of a boiling water reactor. The boiling water reactor is operated at steady state and made the subject of an energy balance. The insertion of the traversing in-core probes occurs by placing the probes at an end of a semirigid cable and effecting the insertion within a tube system. Once a full core scan has occurred, during steady state operation, a heat balance is utilized in combination with the readings of the traversing in-core probes to calibrate the local power range detectors.

Thereafter, the newly calibrated traversing in-core probes travel through the reactor in a specially designed tube system. This tube system constitutes through containment conduits into the interior of the reactor vessel. Into these conduits are placed semirigid cables which cables have the TIPs on the distal end thereof. The TIPs are driven into the drive tube system from large drive mechanisms and the entire system is controlled from an electronic drive control unit. The cables pass through so-called "shear valves" which valves can shear the cable and seal the conduit to prevent through the tube system leaks, which leaks may well be substantial before the cable and probes could be withdrawn. The cables further pass through stop valves admitting the traversing in-core probes to the interior of the vessel containment. Finally, the cables reach so-called indexers, and then to the interior of the reactor vessel. These indexers are a mechanical system for routing each of the TIPs to pass adjacent the site of an assigned segment of the 170 some odd local power range detectors in a large boiling water nuclear reactor. It is normal for an indexer to include 10 alternative paths for a single traversing in-core probe to follow during a calibration procedure.

Needless to say, this system is elaborate and complex. Calibration of each local power range monitor is a function of the probe measurement of the local thermal neutron flux as well as a function of the position of the end of the inserting semirigid cable. Naturally, this position of the end of the semirigid cable has to be referenced to the proper alternative path for the necessary calibration to occur.

Further, the necessary tube system includes a matrix of tubes below the reactor vessel. Normally these tubes must be removed for required below vessel service and replaced thereafter.

Despite the presence of both stop valves and shear valves, the system remains as a possible escape route for water containing radioactive particles from the reactor. Further, the withdrawn cable can have mechanical complications as well as being radioactive.

Gamma thermometers are known. These thermometers measure the gamma ray output from a reactor reaction. Unfortunately, gamma ray output as measured by gamma thermometers does not provide a prompt response to power transients as required for safe operation of the reactor. Consequently, gamma thermometers have not been heretofore used for monitoring core reactive state in boiling water reactors.

SUMMARY OF THE INVENTION

In the core of a boiling water nuclear reactor, local power range monitor strings typically including four vertically spaced monitoring sites are modified. Each monitoring site includes a conventional local power range detector in which fissionable material exposed to thermal neutron radiation produces fission fragments, ionizes a gas and produces a current between the anode and cathode. In the improvement herein, each conventional local power range detector is provided with one or two adjacent gamma thermometers each including an interior mass to be heated by gamma radiation, a thermocouple for measuring the heated mass and a reference thermocouple connected in series. Both the conventional local power range detector and the gamma thermometer(s) are distributed along the length of the string each being provided with a cable and connector for external connection. When the string is inserted into the core and the reactor operated at a steady state, the gamma thermometers can be utilized to calibrate the local power range monitors in conjunction with a conventional reactor heat balance. By the expedient of referencing the gamma flux to the output of the heat balance, calibration of the local power range monitors occurs over their useful in-service life.

OTHER OBJECTS, FEATURES AND ADVANTAGES

An object to this invention is to vastly simplify the local power range monitor calibration system. Accordingly, a new so-called "monitor" string is disclosed in which conventional local power range detectors for the measurement of thermal neutron flux are placed immediately adjacent to gamma thermometers.

An advantage of the disclosed construction is that the gamma thermometers are not appreciably sensitive with prolonged in-service life. Accordingly, and during the steady state operation of the reactor, the gamma thermometers can be used with supplemental heat balances for the required calibration of their adjacent local power range monitors.

A further object to this invention is to disclose a process for the calibration of local power range monitors within a boiling water nuclear reactor. According to this aspect, the reactor is operated at a steady state and a heat balance taken to determine overall reactor output. Thereafter, the gamma thermometers are read for gamma flux and the gamma flux related to reactor power. Corresponding readings are taken from the local power range detectors. These readings, which readings vary with in-service life, are calibrated to the gamma thermometer results. A reliable periodic calibration of the local power range detectors by their adjacent gamma thermometers can occur.

An advantage is that the need for the traversing in-core probe of the prior art is obviated. Accordingly, the system of drive mechanisms, drive control units, tubes, stop valves, shear valves, indexers, and cables utilized in the prior art for periodic calibration can be removed.

BRIEF DESCRIPTION OF THE DRAWINGS

Other objects, features and advantages of this invention will become more apparent after referring to the following specification and attached drawings in which:

FIG. 1 is a schematic of a boiling water nuclear reactor illustrating a local power range monitor string in accordance with this invention being installed into an in-core guide tube for monitoring the nuclear reaction within the reactor core;

FIG. 2A is an enlarged schematic of a local power range monitor string constructed in accordance with this invention illustrating four conventional lower power range detectors and gamma thermometer clusters, the string constructed for installation in the core of a reactor;

FIG. 2B illustrates a cluster of one local power range detectors and two gamma thermometers;

FIG. 2C is a schematic which illustrates a cluster of one local power range detector and one gamma thermometer.

FIG. 3 is a side elevation section of a local power range monitor; and

FIG. 4 is a side elevation section of a gamma thermometer.

Referring to FIG. 1, a reactor vessel V is shown with its dome removed and a local power range monitor string S in the process of insertion. Typically, the string S inserts into tube 24. Tube 24 begins at the core plate 12 and extends through the bottom of the reactor vessel V.

The portion of the string S within the core extends above the tube 24. An upper portion of the string S registers to the top guide 12. Thus the string S as ultimately held to the core stands vertically upright in measuring exposure to the neutron flux interior of the reactor core.

Referring to FIG. 1, a section of a boiling water reactor vessel V is illustrated. The vessel V includes a core shroud 14 surrounding a core 15 controlled by control rods 16. In the portion of the reactor here shown, jet pumps 13 draw water over the top of a top guide 12 downwardly in the interstitial volume between the side of the vessel V and the core shroud 14 through the jet pumps 13 to a plenum P below the core of the reactor. Water then passes upwardly through a core plate 17 into the individual fuel bundles of the core at 15. Water for the jet pumps is extracted at 19, entered at 18 to cause the required forced circulation within the reactor.

As here shown, a single instrument guide tube 24 is illustrated for the insertion of a local power range monitor string. It will be understood that insertion begins from above the core. The string is from the top of the core inserted to the bottom of the in-core guide tube. A seal is made at the bottom of the in-core guide tube. The string extends from the top of the core 15 adjacent the top guide 12. Each string includes typically four monitoring sites. These monitoring sites are equally spaced between the top guide 12 and the core plate 17. They are positioned to sample four successive vertical intervals within the reactor.

Although the illustration of FIG. 1 only shows one such income guide tube 24, it will be understood that many are in fact used to monitor a typical core 15. For example, it is not uncommon to include forty four (43) such conduits or about 170 discretely wired local power range detectors.

The reader will understand that the local power range detectors are combined in varying groups to produce required measurement. Since the combination of such groups is not pertinent to this invention and since the instrumentation for reading such local power range monitors is well known, it will not be further set forth herein.

Having set forth the reactor site in which monitoring occurs, a typical monitoring string S in accordance with this invention will now be set forth.

Referring to the exploded view of FIG. 2A, one such string is illustrated. The string includes a spring compression portion 44. This spring compression portion fits into the top guide 12. (See FIG. 1)

Typically, to cover the active part of the string, there is provided a cover 50. Cover 50 encloses the detectors and coaxial cables, which cables extend from the detectors downward through a seal joint at the bottom of the in-core guide tube and are terminated in an external connector. The string is semirigid in construction. Insertion to in-core guide tube 24 easily occurs. (See FIG. 1)

At four discrete elevations, herein denominated A, B, C, and D, groups of conventional local power range detectors and gamma thermometers are placed in a relation which may be side-by-side or vertical.

Referring to FIGS. 2B and 2C, a conventional local power range detector M will first be described. Thereafter, the gamma thermometer T will be set forth.

Referring to FIG. 3, local power range detector M includes an outer cylindrical cathode 60 and an inner concentric and cylindrical anode 62. Cathode 60 adjacent to anode 62 is provided with a thin coating of fissionable materials 64. Materials 64 are typically combinations of U235 and U234. As is well known in the art, U235 is expended over the life of the monitor M; the U234 breeds replacement U235 thus prolonging the in-service life of the detector M.

Typically, anode 62 is mounted by insulating blocks 66 at each end so as to be concentric of the enclosing cathode 60. Preferably, an argon atmosphere 68 is present.

Typically a coaxial cable leads from the detector with the center conductor connected to the anode and the outer conductor connected to the cathode. It is the direct current through the cable that provides the real time measurement of thermal neutron flux.

In operation, thermal neutrons impact U235 at layer 64. Fission components dissipate into the argon gas 68 and cause electrons to flow to the anode with ions of opposite polarity to the cathode. An overall direct current is induced through the cable 69 which direct current is conventionally read.

Since the U235 component of the layer 64 varies with in-service life, calibration is required.

Referring to FIG. 4, a typical gamma thermometer is illustrated in a simplistic format.

Typically, the gamma thermometer includes an enclosing chamber 72 having a metal mass 74 suspended in a cantilevered fashion from one end of the chamber 72. The mass of metal 74 reaches a temperature which is directly dependent on the gamma ray flux.

A reading thermocouple 78 and a reference thermocouple 80 are utilized in a series circuit. Specifically, the temperature differential between the reference thermocouple 80 (typically referenced to a temperature stable interior portion of the core) and the reading thermocouple 78 produce a voltage on paired lines 82, 84 which voltages indicate the gamma flux present which is proportional to reactor power.

It will be appreciated that gamma thermometers T are not responsive t rapidly changing reaction within the reactor. Accordingly, it is not possible to use the gamma thermometer T for monitoring short duration flux transients or rapidly changing flux levels.

Having set forth the construction of the gamma thermometers and local power range monitors, description of clusters of instruments utilized at the various cluster levels A, B, C, and D can now be set forth. Referring to FIG. 2B a preferred embodiment of the invention is disclosed. The preferred embodiment includes a cover tube 70 having an upward water flow therethrough. In the interior of the tube at 72 a gamma thermometer T1 and a second gamma thermometer T2 are each individually shown. These respective gamma thermometers T1 and T2 are communicated to their respective cables 74, 76. In between the respective gamma thermometers there is located a local power range monitor M.

It will be observed that the local power range monitor is separated from both gamma thermometers by a small distance d. This distance is chosen so that the neutron flux is essentially uniform. For example, a 1 inch level of separation may be used.

Referring to FIG. 2C an embodiment having a single local power range monitor M and a gamma thermometer T is illustrated. Again insertion has occurred interior of a sheath 70 having water flow in the space 72. Again each of the sensor units is communicated to its own cable. In this case cable 75, 76.

Returning to FIG. 2A the discrete parts of the local power range monitor string can be further understood. Simply stated, the local power range monitor string includes a spring compression portion 80 (see spring portion 44). A considerable length of the entire rod 82 fits within the active fuel region. A second length of the monitor string 84 sits below the core and within the reactor vessel.

Finally, a portion of the string 86 is outside the vessel. As the unit passes through the vessel, a pressure seal 88 is required. This pressure seal prevents leakage from the pressurized interior of the reactor to the exterior thereof. Instrumentation connects to the wire ends 90 from the respective local power range monitors M or gamma thermometers T. Dependent on the number of gamma thermometers utilized for each level, there will be at least one local power range monitor M with paired connections and two or four connections from the respective gamma thermometers T.

The required energy balance measuring the power output of a steady state nuclear reactor is well within the state of the art.

Once this is known, measurement of the gamma thermometers can all be correlated to the intensity of the reaction at any given point. Since there is one or two gamma thermometers T adjacent each and every local power range monitor M, it is thereafter possible to calibrate each local power range detector M with the readout of its adjacent gamma thermometer T.

It will be observed that gamma thermometers do not include portions thereof which, with increased in-service life, have decreasing effectiveness. This being the case, it will be understood that with reference to any heat balance, there is an expectancy that the output of the gamma thermometers T will remain substantially unchanged. There is therefore an additional check as to the overall operability of the calibration.

I claim:

1. In a boiling water reactor having a reactor vessel, a core for containing a reaction within said reactor vessel, and a plurality of vertical in-core guide tubes extending from outside the reactor vessel into the core of said vessel at spaced apart locations, said vertical in-core guide tubes extending upwardly to the bottom of core to permit the insertion and removal of monitoring strings having local power range detectors for measuring the thermal neutron flux density interior of the core, the improvement comprising:

a string having a plurality of local power range detectors, each monitor including a cathode; fissionable material on said cathode; an anode insulating material; and wiring connecting each said anode and cathode from a position on said string interior of said core to a position through said in-core guide tube exterior of said reactor vessel, each said local power range detector being placed in spaced apart relation along an end of said string whereby when said string is inserted to the end of said vertical guide tubes in said core, said local power range monitors will be in spaced vertical relation along said conduits in said core for measuring the thermal neutron flux;

said string having a corresponding plurality of gamma thermometers, each said gamma thermometer provided along the length of said string at a position immediately adjacent a local power range monitor, each said gamma thermometer for monitoring the temperature of said gamma thermometers with respect to a reference to determine the gamma flux of said reactor adjacent said local power range monitor whereby during conditions of steady state power operation readings of said gamma thermometers can be used for the calibration of said local power range monitors.

2. The invention of claim 1 and including four local power range monitors and four or eight gamma thermometers on said string.

3. A process of calibrating local power range monitors in a boiling water reactor by a calibration detector inserted into a vertical in-core guide tube exterior of said vessel, said vertical in-core guide tube passing upward into the interior of said vessel core, said calibration process comprising the steps of;

providing a monitoring string, said monitoring string having a plurality of local power range monitors including an anode, a cathode, fissionable material placed on said cathode and mineral insulated connecting each said anode and cathode in parallel to remote leads for connection to monitoring current reading instrumentation, each said local power range monitor being spaced in spaced apart relation along said string;

providing further in said string, gamma thermometers, each gamma thermometer including a mass for absorbing gamma rays and varying in temperature with respect to the flux of said absorbed gamma rays, said gamma thermometer including a reading thermocouple and a reference thermocouple;

each said gamma thermometer placed immediately adjacent a local power range monitors;

providing connection means for each said gamma thermometer to conventional paired leads for reading said thermocouples to determine gamma flux interior of said reactor;

operating said reactor at a steady power state;

taking an energy balance of said reactor to determine the reactor power output;

relating the power output at any portion of said reactor to a gamma thermometer reading;

taking the reading of a corresponding and immediately adjacent local power range monitor;

and calibrating the determined neutron flux from the reading of said local power range monitor to the reading of said gamma thermometer for the overall calibration of said local power range monitor.

* * * * *